(12) United States Patent
Yu et al.

(10) Patent No.: US 7,808,514 B2
(45) Date of Patent: Oct. 5, 2010

(54) MULTIPLANAR REFORMATTING VISUALIZATION WITH MULTIPLE SCROLLING SPEEDS

(75) Inventors: Daphne Yu, Yardley, PA (US); Robert Schneider, Roβtal (DE)

(73) Assignees: Siemens Medical Solutions USA, Inc., Malvern, PA (US); Siemens Aktiengesellschaft, Munich (DE)

(*) Notice: Subject to any disclaimer, the term of this patent is extended or adjusted under 35 U.S.C. 154(b) by 650 days.

(21) Appl. No.: 11/753,663

(22) Filed: May 25, 2007

(65) Prior Publication Data

US 2007/0296740 A1    Dec. 27, 2007

Related U.S. Application Data

(60) Provisional application No. 60/815,392, filed on Jun. 21, 2006.

(51) Int. Cl.
G09G 5/00    (2006.01)

(52) U.S. Cl. ..................... 345/684; 345/419

(58) Field of Classification Search .......... None
See application file for complete search history.

(56) References Cited

U.S. PATENT DOCUMENTS

| | | | |
|---|---|---|---|
| 6,500,118 B1 * | 12/2002 | Hashimoto | 600/437 |
| 6,690,371 B1 * | 2/2004 | Okerlund et al. | 345/424 |
| 6,947,584 B1 * | 9/2005 | Avila et al. | 382/131 |
| 7,212,198 B2 * | 5/2007 | Muraki et al. | 345/419 |
| 7,233,964 B2 * | 6/2007 | Bakalash et al. | 708/207 |
| 2004/0125103 A1 * | 7/2004 | Kaufman et al. | 345/419 |
| 2005/0184988 A1 * | 8/2005 | Yanof et al. | 345/424 |
| 2006/0033728 A1 * | 2/2006 | Sako | 345/204 |
| 2006/0066611 A1 * | 3/2006 | Fujiwara et al. | 345/419 |
| 2006/0114254 A1 * | 6/2006 | Day et al. | 345/424 |
| 2007/0024595 A1 * | 2/2007 | Baker et al. | 345/173 |
| 2007/0081704 A1 * | 4/2007 | Pan et al. | 382/128 |

OTHER PUBLICATIONS

Ming Wan, "Fast and Reliable Space Leaping For Interactive Volume Rendering", IEEE Visualization, 2002, Oct. 27-Nov. 1, 2002, 8 pgs.

* cited by examiner

*Primary Examiner*—Kee M Tung
*Assistant Examiner*—David H Chu
(74) *Attorney, Agent, or Firm*—Donald B. Paschburg

(57) ABSTRACT

Multiplanar reformatting visualization is provided with multiple scrolling speeds. A plurality of buffers is provided. Each buffer stores composites of data from different planes. The amount of compositing to generate a total composite for a visualization may be less since the division into partial composites may reduce addition and subtraction or other compositing operations. One level of partial composite buffers may be used. The total is recomputed for each visualization. In other embodiments, a hierarchal buffer structure is used. For example, a total composite buffer is provided in addition to the partial composite buffers. By re-compositing the partial composites before and after adjustment for scrolling increment from the total composite buffer, the total composite is updated for scrolling. Two or more levels of buffers may be used.

19 Claims, 3 Drawing Sheets

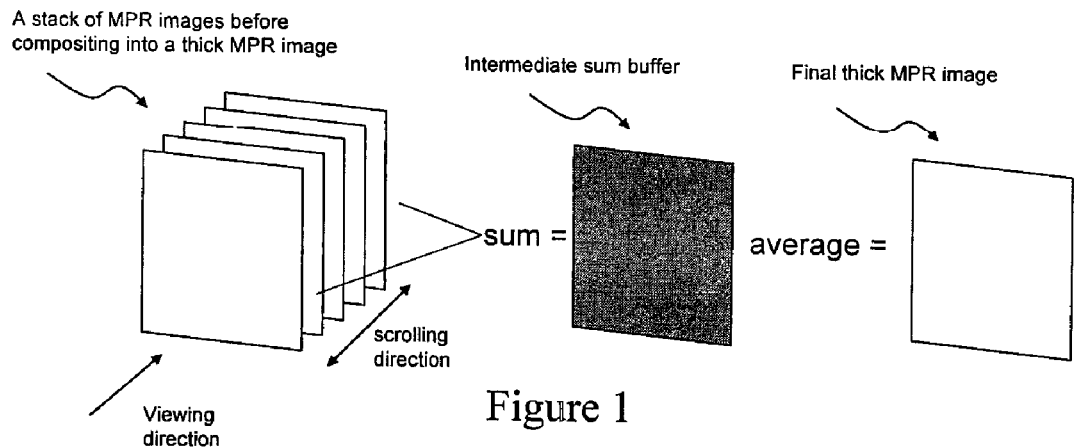
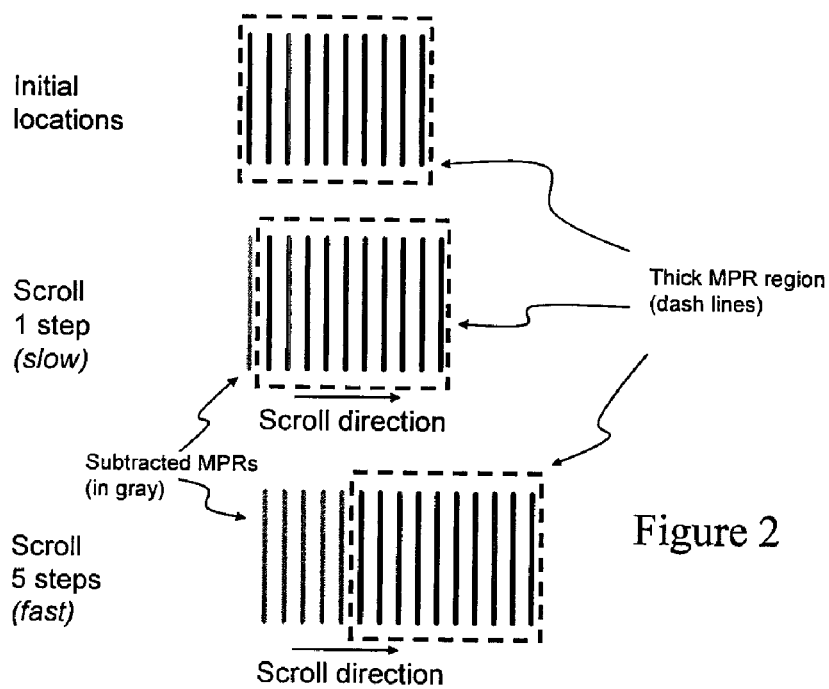

MULTIPLANAR REFORMATTING VISUALIZATION WITH MULTIPLE SCROLLING SPEEDS

RELATED APPLICATIONS

The present patent document claims the benefit of the filing date under 35 U.S.C. §119(e) of Provisional U.S. Patent Application Ser. No. 60/815,392, filed Jun. 21, 2006, which is hereby incorporated by reference.

BACKGROUND

The present embodiments relate to multiplanar reformatting (MPR). MPR is used in medical visualization for extracting an arbitrarily oriented two-dimensional (2D) composite image. The MPR may be composed from a single image or a plurality of images representing intersecting planes in different positions and orientations within a single or a plurality of volumes. Typically, when an MPR is visualized using a plurality of reformatting planes, known as thick MPR, the planes have the same orientation but different offset positions (i.e., adjacent parallel planes). The data corresponding to the planes are composited into a single output image. The composition is by averaging, computing the maximum, or blending. FIG. 1 shows one example of compositing in MPR. For compositing by averaging, the data for the individual MPR planes is extracted, the sum of all the data for the extracted MPR planes is computed and stored into an intermediate sum buffer, and the final output is averaged.

For scrolling MPR, the thick MPR location is changed only along the viewing normal or direction (see FIG. 1). Scrolling MPR is used to reveal the structure and progression of anatomical structures. A sequence of visualizations representing different depths within the volume along the viewing direction is generated. Fast interactivity for scrolling MPR is important not only from the point of efficiency but is also a highly desirable feature for assisting clinical evaluation. FIG. 2 shows the planes for thick MPR edgewise with a dashed line indicating the included planes. Slow scrolling, such as by the one plane step shown, may be used for fine adjustment or considered diagnosis. Rapid scrolling, such as by the five-plane step shown, may be used to more quickly identify a region of interest.

The number additions and subtracts may increase with greater scrolling speeds. The increase may slow performance of the processor rendering the thick MPR, causing a slow down in scrolling or distracting jumps in visualization.

Acceleration techniques available in the art of volume rendering such as data downsizing, space leaping, and early ray termination may only accelerate thick MPR rendering for a limited number of cases. Data downsizing reduces the data used, but may decrease resolution. Data downsizing is not an acceptable practice for scroll MPR rendering since high resolution is desired for close clinical examination of pathologies. Space leaping and early ray termination techniques rely on intelligent skipping of image regions not visible in the rendering settings. However, particularly for average compositing, since all MPR values are needed in the averaging composition, any skipped image value may affect the output quantitatively. For maximum composition, space leaping techniques may be acceptable in some limited cases for improving interactivity and are not used for evaluation quality MPRs. In general, space leaping and early ray termination techniques are effective mostly for blend compositions. These volume rendering acceleration techniques alone cannot fully resolve the performance issues with diagnostic quality scrolling thick MPR.

Another method for accelerating scrolling thick MPR does so by enforcing a fixed scrolling increment rule. Scrolling is limited to fixed sampling distances. Under this rule, the planes within a thick MPR between the sequential visualizations usually highly overlap. If the data for the planes within the thick MPR is stored, the data may be reused without re-computation for the next visualization (thick MPR). FIG. 2 shows one example. This method is effective in reducing the MPR computation, but the memory storage requirement is usually too high when the thickness is large, such as tens or hundreds of planes.

Average composition may be assisted by storing a single sum from the previous visualization rather than the data for all the planes. In this scheme, at each scroll increment, the data for the removed plane image is recomputed and subtracted from the previous sum buffer. The data for the newly included plane is computed and added before averaging. For each visualization, the data for one or more planes no longer included in the thick MPR are subtracted and the data for planes now included is added to the sum. This method is highly effective for accelerating scrolling thick MPR when the number of scroll increments (i.e., the step size for scrolling) between visualizations is very small. For larger scrolling increments, little reduction in computations may result.

The control of the size of scroll increments is typically driven by the speed of a computer mouse, with fast speed mapping to stepping by a large number of planes. When the scroll increment is large, however, the simple fixed scrolling increment method fails to provide any acceleration, and in some cases actually induces extra computational overhead because the computation of the subtracted and added planes is intensive. The result is an unpleasant delay during scrolling interaction. The delay may distract a clinician from properly evaluating the anatomical structures in the images.

BRIEF SUMMARY

By way of introduction, the preferred embodiments described below include methods, systems, instructions, and computer readable media for multiplanar reformatting visualization with multiple scrolling speeds. A plurality of buffers is provided. Each buffer stores composites of data from different planes. The amount of compositing to generate a total composite for visualization may be less since the division into partial composites may reduce addition and subtraction or other compositing operations. One level of partial sum buffers may be used. The total is recomputed for each visualization. In other embodiments, a hierarchal buffer structure is used. For example, a total composite buffer is provided in addition to the partial composite buffers. By re-compositing the partial composites before and after adjustment for scrolling increment from the total composite buffer, the total composite is updated for scrolling. Two or more levels of buffers may be used.

In a first aspect, a system is provided for multiplanar reformatting visualization with multiple scrolling speeds. A memory is operable in a hierarchal buffer structure. Each level of the hierarchal buffer structure has one or more buffers each storing a sum of a number of frames of data. The number for each level is different. A user input is operable to receive scrolling speeds. Different scrolling speeds are mapped to different levels of the hierarchal buffer structure. A processor is operable to subtract from and add to the sums in each level and operable to select, as a function of the scrolling speed, one or more buffers for subtracting and adding. A display is operable to display a sequence of images representing scrolling a multiplanar reformatting visualization through a volume at the scrolling speed. Each multiplanar reformatting visualization is an average from the sum of one of the buffers of the hierarchal buffer structure.

In a second aspect, a method is provided for multiplanar reformatting visualization with multiple scrolling speeds. At least first and second partial sums are calculated. A first total sum of a first plurality of frames of data is calculated. A first image is generated as a function of the first total sum. A scroll input designating a second plurality of frames of data is received. At least the first partial sum and the total sum are altered as a function of the scroll input. A second image is generated as a function of the altered total sum.

In a third aspect, a computer readable storage medium has stored therein data representing instructions executable by a programmed processor for multiplanar reformatting visualization with multiple scrolling speeds. The storage medium includes instructions for creating a hierarchal arrangement of composite buffers, the arrangement having at least two levels, each level associated with a different scroll speed limit, and the buffers of each level having an upper limit of frames included in a composite, the upper limit of one level being greater than an upper limit of another level; and generating multiplanar reformatting visualizations as a function of composites of the buffers in the hierarchal arrangement.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 1 is a graphical representation of thick multiplanar reformatting for visualizing an average composite;

FIG. 2 is a graphical representation of scrolling in thick multiplanar reformatting;

DETAILED DESCRIPTION OF THE DRAWINGS AND PRESENTLY PREFERRED EMBODIMENTS

Figure 3:
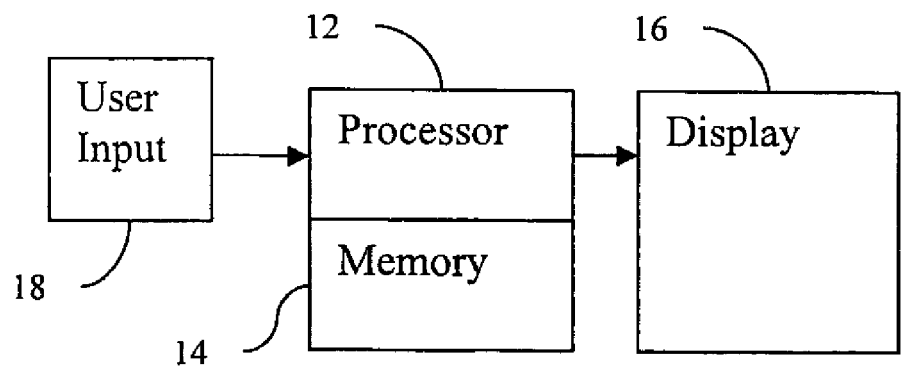
FIG. 3 is a block diagram of one embodiment of a system for multiplanar reformatting visualization with multiple scrolling speeds.

The fixed scrolling increment method is extended to accelerate scrolling thick MPR computation at various scrolling speeds. Scrolling multiplanar reformatting (MPR) visualization is accelerated by using more than one buffer for storing composites of data from a plurality of frames or planes. Instead of relying on a single composite buffer from the previous image, a system of buffers is organized. For example, a multiple level or hierarchal storage system provides acceleration for multiple scrolling speeds while minimizing storage requirements. Each level includes multiple composite buffers sized to favor the reduction of computation for a particular number of scroll increments. The number of accelerated speed levels is highly flexible and may be configured. The end user may review thick MPR visualizations intuitively at any speed or different speeds without computational delays.

In one example, a scroll increment of ten images is desired for an average thick MPR visualization composed from one hundred MPR frames of data. A total composite and composites of every ten frames of data are stored with a total of eleven buffers. The calculation of the new total sum only requires the subtraction of one sum buffer from the previous total buffer, followed by the addition of ten newly computed frames of data. Compared to the single buffer scheme, this multiple buffer approach removes the necessity of twenty re-computations of frames of data, ten additions, and ten subtraction operations. Although extra addition operations may be needed in some instances, this operation is less time consuming than the re-computation of MPR frames of data.

If a different number of scroll increments are desired, for example, at five images, a scroll level with twenty sum buffers may be used. Alternatively, both a size ten and size five scroll levels can be stored to favor both increment sizes if the required storage is acceptable. A smooth scrolling performance may be provided, even for scrolling increments different than the buffer sizes (e.g., 1-4, and 6-9 for the size 5 and 10 example). The update of the size ten sum buffer level may occur from the size five level using a single add operation. The memory usage of the storage buffer may be flexibly configured based on the system resources, performances, and the desired increments.

Any type of compositing may be used, such as averaging, maximum selection, or blending. For simplicity, in the following sections, the hierarchical composite buffers for the case of the average compositing using sum buffers are used. The same or similar structures may be used for maximum and blended compositions. Although the average composition has an associative property that the maximum and blended compositions do not have, this only slightly modifies the inter-level update method for the maximum and blended compositions. For the average composition, the child node may be subtracted from its parent when it is pruned from the graph. For maximum and blended compositions, the parent is updated from all its remaining children whenever a child is pruned or removed due to scrolling.

FIG. 1 shows a system for multiplanar reformatting visualization with multiple scrolling speeds. The system includes a processor 12, a memory 14, a display 16, and a user input 18. Additional, different, or fewer components may be provided. For example, a network or network connection is provided, such as for networking with a medical imaging network or data archival system.

The system is part of a medical imaging system, such as a diagnostic or therapy ultrasound, x-ray, computed tomography, magnetic resonance, positron emission, or other system. Alternatively, the system is part of an archival and/or image processing system, such as associated with a medical records database workstation or networked imaging system. In other embodiments, the system is a personal computer, such as desktop or laptop, a workstation, a server, a network, or combinations thereof for scrolling with multiplanar reformatting rendering an image or visualization from frames of data for a plurality of parallel planes (i.e., thick MPR).

The user input 18 is a keyboard, trackball, mouse, scroll wheel, joystick, touch screen, knobs, buttons, sliders, touch pad, combinations thereof, or other now known or later developed user input device. The user input 18 generates signals in response to user action, such as user rotating a scroll wheel.

The user input 18 operates in conjunction with a user interface for context based user input. Based on a display, the user selects with the user input 18 one or more controls, rendering parameters, values, multiplanar reformatting parameters (e.g., number of planes in a thick rendering, position of planes, or scroll speed), or other information. For example, the user rotates a scroll wheel or provides another scrolling indicator (e.g., clicks a mouse on a bar or button). Different scrolling speeds may be indicated. Alternatively, the processor 12 automatically sets any parameters, such as scroll speed.

The scroll input is mapped to the different increments in the thick MPR. Using the hierarchal buffer structure, the different scrolling speeds map to different levels of the hierarchal structure directly or indirectly (e.g., map to increments which map to the levels). Each level of the hierarchal structure has buffers associated with a particular number of composited frames of data. The frame skip size or number of planes to be incremented in response to the scrolling is mapped to the level with the closest but greater or equal number of composited frames of data in each buffer. Multiple speeds may map to a same level, such as associated with a single level buffer structure.

The memory 14 is a graphics processing memory, video random access memory, random access memory, system memory, cache memory, hard drive, optical media, magnetic media, flash drive, buffer, combinations thereof, or other now known or later developed memory device for storing data or video information. Combinations of the same or different types of components may be used.

The memory 14 stores one or more datasets representing a three-dimensional volume for rendering. Any type of data may be used for multiplanar reformatted visualization, such as medical image data (e.g., ultrasound, x-ray, computed tomography, magnetic resonance, or positron emission). The visualization is rendered from data distributed in an evenly spaced three-dimensional grid, but may be from data in other formats (e.g., rendering from scan data free of conversion to a Cartesian coordinate format or scan data including data both in a Cartesian coordinate format and acquisition format). The data is voxel data of different volume locations in a volume. The voxels are the same size and shape within the dataset. Voxels with different sizes, shapes, or numbers along a dimension may be included in a same dataset, such as is associated with anisotropic medical imaging data. The dataset includes an indication of the spatial positions represented by each voxel.

The dataset is provided in real-time with acquisition. For example, the dataset is generated by medical imaging of a patient. The memory 14 stores the data temporarily for processing. Alternatively, the dataset is stored from a previously performed scan. In other embodiments, the dataset is generated from memory, such as associated with rendering a virtual object or scene.

The same memory component or a different memory component of the memory 14 provides a multiple buffer structure, such as a hierarchal buffer structure. The memory 14 is formatted as, addressed as, or operates a plurality of buffers. Buffers may include physical buffers or memory devices (e.g., system memory) formatted, addressed or operated, at least in part, as buffers or data storage locations.

In one embodiment, only two buffers or multiple buffers in one level store different composites of frames of data. The composites are of a same or different number of frames of data, such as two buffers each with an average, maximum, or blend of different sets of ten frames of data. The sets overlap or are exclusive of each other.

In other embodiments, the buffers are arranged in a hierarchal buffer structure. Each level of the hierarchal buffer structure has one or more buffers. Each buffer of a level is for storing a composite (e.g., sum) of a number of frames of data. For example, the buffers of one level each store a composite of 10 frames of data, and the buffers of another level each store a composite of 20 frames of data. The maximum limit for the number of composited frames for the buffers of each level is different. Within a level, the maximum limit of the number of frames for each buffer is the same, but the actual number of frames stored may be less than the limit.

The composites for the buffers of each level are formed from overlapping sets of frames of data. The levels are related to each other, such as a buffer of one level storing a composite formed as a function one or more composites in buffers of another layer. A pyramid or other arrangement may be provided.

In one embodiment, one level includes a single buffer for a total composite. For example, three levels are provided. A first level has buffers (each storing composites of X number of frames), a second level has buffers (each storing composites of about 2X numbers of frames), and the third level having a single buffer (storing the total composite of Y number of frames). X may be 1 or more with the first level including three or more buffers and the second level including two or more buffers but fewer than the first level. The first two levels have a 2:1 ratio of the number of frames for each buffer. The "about" accounts for 1:1 ratios or other relationships on the ends of the level due to scrolling increments or a total number of frames not being divisible by the number of frames for each buffer of a level. Other ratios may be provided.

A total count of the frames in each level is substantially equal. In the three level example above, the first level has about twice as many buffers as the second level. The number of buffers in each level is different, but may be the same. In alternative embodiments, the total count of frames is different for different levels.

The processor 12 is a central processing unit, control processor, application specific integrated circuit, general processor, field programmable gate array, analog circuit, digital circuit, graphics processing unit, graphics chip, graphics accelerator, accelerator card, combinations thereof, or other now known or later developed device for rendering and/or compositing. The processor 12 is a single device or multiple devices operating in serial, parallel, or separately. The processor 12 may be a main processor of a computer, such as a laptop or desktop computer, may be a processor for handling some tasks in a larger system, such as in an imaging system, or may be a processor designed specifically for rendering. In one embodiment, the processor 12 is, at least in part, a personal computer graphics accelerator card or components, such as manufactured by nVidia (e.g. Quadro4 900XGL or others), ATI (e.g. Radeon 9700 or others), or Matrox (e.g. Parhelia or others). The processor 12 may be hardware devices for accelerating volume rendering processes, such as using application programming interfaces for three-dimensional texture mapping or thick multiplanar reformatting. Example APIs include OpenGL and DirectX, but other APIs may be used independent of or with the processor 12. The processor 12 is operable for volume rendering a thick multiplanar region based on the API or an application controlling the API. The processor 12 is operable to texture map with alpha blending, minimum projection, maximum projection, surface rendering, or other volume rendering of the data. Other types of volume rendering, such as ray casting, may be used.

The processor 12 is operable to create composites, alter composites, access the buffers, and store the composites in the buffers. For example, the processor 12 creates frames of data associated with planes, such as interpolating from a three-dimensional volume set of data. The frames of data are composited with other frames, such as adding frames of data. The frames of data may be added or subtracted from existing composites. For maximum or blending, new frames of data may be included or old frames excluded from sets of frames of data for compositing.

The processor 12 is operable to add or subtract composites from other composites. For example, a composite in one level is subtracted from the composite of another level, such as subtracting a sum in one buffer of a lower level from another buffer of a higher level. As another example where scrolling at a slower speed is performed, a composite of a mid-level is subtracted from a composite of a higher level (e.g., a composite of a greater number of frames of data), a composite from a lower level is then subtracted from the mid-level composite, and the updated mid-level composite is added to the previously altered composite of the higher level.

The processor 12 selects the buffers and corresponding composites for updating. The selection is a function of the scrolling speed and scrolling direction. The scroll speed indicates the increment size, indicating frames of data to be removed and frames of data to be included. The direction of scrolling further defines the frames for inclusion or removal. For removal, the frames of data to be removed and composites formed as a function of the frames of data to be removed are selected. For new inclusion, the frames of data to be newly included and the composites formed as a function of the frames of data to be newly included are selected. The selected composites are updated, such as by adding and/or subtracting.

The display 16 is a monitor, LCD, projector, plasma display, CRT, printer, or other now known or later developed devise for outputting visual information. The display 16 receives images, image format, or other information from the processor 12. The received information is provided to the user by the display 16.

For example, the display 16 displays a multiplanar reformatting interface. The user selects one or more cut-planes in a volume. The user may select a thickness for thick multiplanar reformatting visualization. In one embodiment, the user interacts with a displayed three-dimensional rendering using displayed tools. The interaction establishes one or more locations for a thick multiplanar reformatting. Alternatively, the processor 12 automatically determines a portion or all of the parameters for thick multiplanar reformatting, such as providing a scroll through sequence automatically with a preset thickness given a user input viewing direction.

The display 16 displays a sequence of images representing scrolling a multiplanar reformatting visualization through at least a portion of a volume. Each multiplanar reformatting visualization is formed from a total composite, such as an average from the total sum of one of the buffers of the hierarchal buffer structure. Each visualization may be formed from composites other than the total composite. The images may be displayed alone or with other images, such as other multiplanar images and/or three-dimensional renderings.

The sequence is displayed as a function of the scrolling speed. The frames of data included within a visualization are based on a window. The window increments different amounts for different scrolling speeds. Greater increments result in the sequence of visualizations appearing to move through the volume more quickly than smaller increments.

The memory 14 and/or another memory stores instructions for operating the processor 12. The instructions are for multiplanar reformatting visualization with multiple scrolling speeds. The instructions for implementing the processes, methods, and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

FIG. 2 shows a method for multiplanar reformatting visualization with multiple scrolling speeds. The method is implemented by the system of FIG. 1 or another system. The method is performed in the order shown or other orders. Additional, different, or fewer acts may be provided. For example, multiple buffers in a non-hierarchal arrangement are established in act 22. As another example, other compositing is used, such as maximum selection or blending.

A dataset for multiplanar reformatting is received. The dataset is received from a memory, from a scanner, or from a transfer. The dataset is isotropic or anisotropic. The dataset has voxels spaced along three major axes or other format. The voxels have any shape and size, such as being smaller along one dimension as compared to another dimension.

Values for viewing parameters are received. The viewing parameter values determine one or more planar locations relative to the volume represented by the dataset. The viewing parameters may include a thickness or number of parallel planes associated with one or more of the planar locations or orientations. The viewing parameters may also include planar spacing, scale, zoom, shading, lighting, compositing technique, and/or other rendering parameters. User input or an algorithm defines the values of the parameters.

In act 22, a hierarchal arrangement of composite buffers is created. The arrangement is created by memory addressing, provision of a physical hierarchy, mapping, or other process. A developer may program or define the hierarchy. The program creates the arrangement based on set or predetermined parameter values or values determined during use. For example, the number of frames of data (i.e., thickness), range of scroll speeds, volume dataset size, or other parameter may be used to determine the number of buffers, number of levels, limits on the number of frames composited in buffers of different levels, or other characteristic of the hierarchal arrangement. A plurality of arrangements or arrangement function may be used for allowing user selection of different parameter values. One arrangement may be used for different parameter values.

The hierarchal arrangement has at least two levels. For example, a total composite buffer is provided as one level, and two or more partial composite buffers are provided as another level. Each level is associated with a different scroll speed limit. For example, the limit on the number of frames of data in a composite of a given buffer of a level is also a scroll speed limit given in number of frames incremented. The different levels have different limits on the number of frames in a composite of each buffer and a corresponding upper limit of scroll speed given in frame increments.

Figure 5:
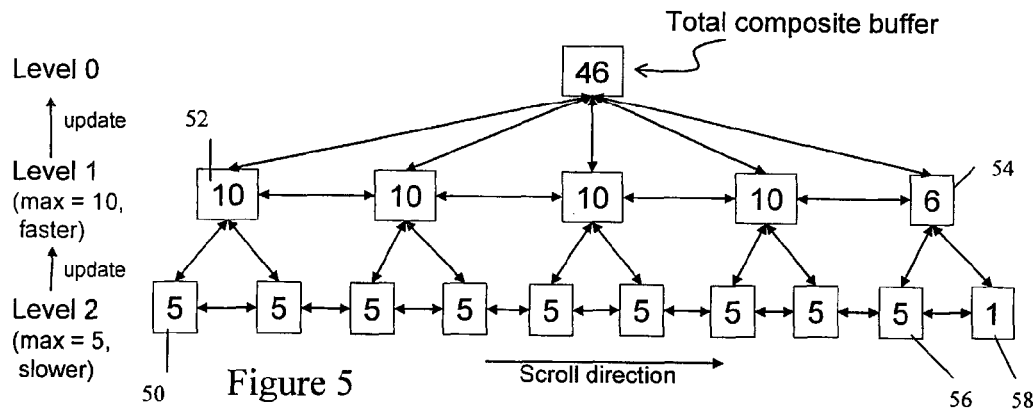
FIGS. 5-7 show an example buffer hierarchy and associated compositing for scrolling multiplanar reformatting visualization.

FIG. 5 shows one example hierarchal arrangement. A hierarchical graph is shown. In this approach, the buffers are organized in an interconnected graph with a buffer at each graph node. Three levels are provided in the example of FIG. 5. The limit on the number of frames in each partial composite and corresponding scroll increment for the lower level (level 2) is 5, and the limit on the number of frames in each partial composite and corresponding scroll increment for the middle level (level 1) is 10. The third level is the total composite, single buffer level where the total number of frames is 46. Buffer 54 of the middle level includes a composite of 6 frames, which is under the limit of 10, due to the total being 46. Similarly, buffer 58 of the lower level includes a composite of 1 frame. Other numbers of frames, levels and limits may be used.

The arrows between the buffers of the hierarchal arrangement indicate access (e.g., interconnectivity and direction of access from one node to another). By providing access between composite buffers within levels and between levels, the composites of different buffers may be combined. In the embodiment shown, the access is arranged in a generally pyramidal structure. Multiple lower level buffers (children) access a particular middle level buffer (parent), and multiple or all of the middle level buffers (children) access the total buffer (parent). Each node within the graph is able to access horizontally to adjacent nodes in the same level, as well as parent and children nodes in the levels above and below, respectively. The horizontal access allows compositing of the partial composites of children nodes for a parent node. Access to each node's parent allows update of a child buffer to the parent buffer. Access to the children nodes allows for pruning of the graph, which is done as each node is to be subtracted from its parent for removing the contribution of frames of data no longer included in the scroll window.

The levels correspond to different scroll speeds. When the user specifies to scroll at the slow speed, level two is chosen. For greater speeds, level one is chosen. The scroll speed is limited to a maximum increment, such as 10 in FIG. 5, but may not be limited, allowing larger increment using level zero. The design of the size of each composite in each level allows a smooth scrolling experience.

Figure 4:
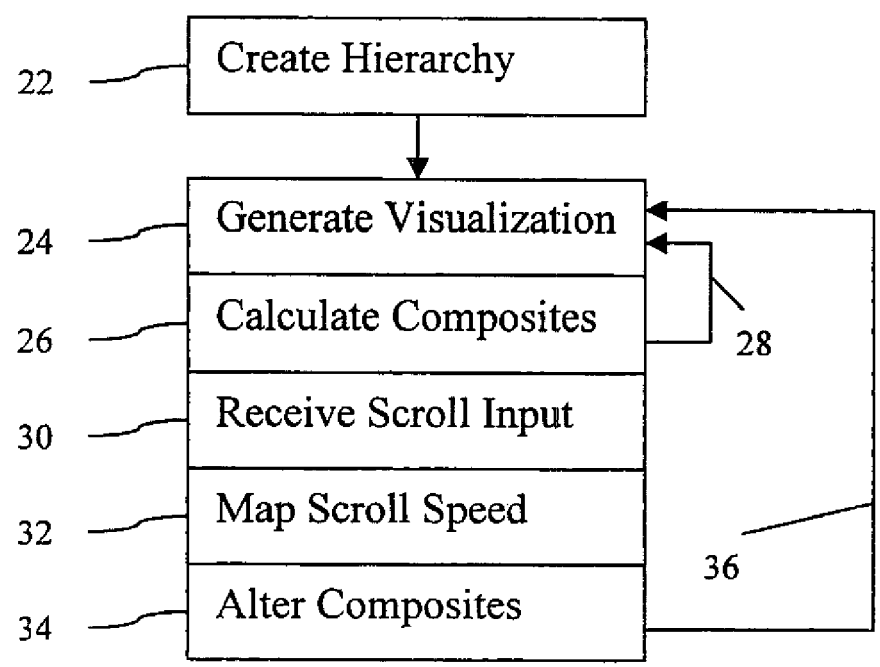
FIG. 4 is a flow chart diagram of one embodiment of a method for multiplanar reformatting visualization with multiple scrolling speeds.

In act 24 of FIG. 4, a multiplanar reformatting visualization is generated. The visualization is an image generated as a function of composites of the buffers in the hierarchal arrangement. For example, the total composite is used. For compositing by averaging, the composite in the buffer is a sum. The sum is divided by the number of frames to provide an average (e.g., divide the sum by 46 in the example of FIG. 4). Sums are provided for each spatial location, so a two-dimensional image of the average across the frames of data is provided. For compositing by blending or maximum, the values for each spatial location in the composite of the final or total buffer are used. The values are mapped to display luminance and/or color. Other rendering of the thick region may be used.

To provide the total composite, the partial composites of other levels are calculated. For example, the frames of data to be included in the total are divided into two or more exclusive groupings. The partial composites of a same level do not include any common frames of data. Alternatively, a frame of data is common to partial composites of a same level. The frames of each grouping are composited as partial composites in buffers. The total is composited from the partial composites.

In the example of FIG. 5, the 46 frames of data are divided into 10 groups—nine groups of 5 and one group of 1. A composite for each group (a partial composite) is stored in a respective buffer. The frames of data for this lower level two are composited within the groupings. For the middle level one, the partial composites of the lower level two are composited. The 46 frames of data or 10 partial composites are divided into 5 groups—4 groups of 10 and one group of 6. The partial composites of the middle level one are calculated from the children node partial composites of the lower level two. The total composite of level zero is formed by compositing from the partial composites of the middle level one. For an average, the compositing is summing.

For an initial visualization or a visualization after an increment size larger than the total scroll window thickness, the composites of the various buffers and levels are built up from the frames of data and/or lower level partial composites. For subsequent visualizations, the total composite and/or one or more partial composites are responsive to previous alteration.

In act 28, the calculated total composite is used to generate a visualization. This generation is performed as described above for act 24. An image is generated as a function of the first total composite.

In act 30, a scroll input is received. The scroll input designates a plurality of frames of data to include in a visualization. The scroll input includes a direction and speed. The direction provides for which direction in which to scroll. The speed provides the increment or number of frames to move for a given increment. For example with respect to FIGS. 5 and 6, the scroll direction is to the right by five frames of data. Five previous frames of data composited within the hierarchal arrangement are to be removed and five new frames of data are to be included. Forty-one frames of data are a subset included in the previous visualization and a current visualization.

Figure 6:
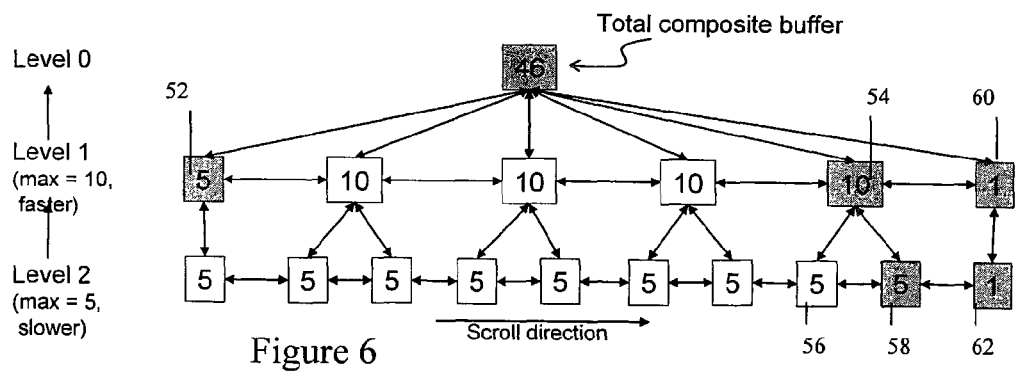
Figure 7:
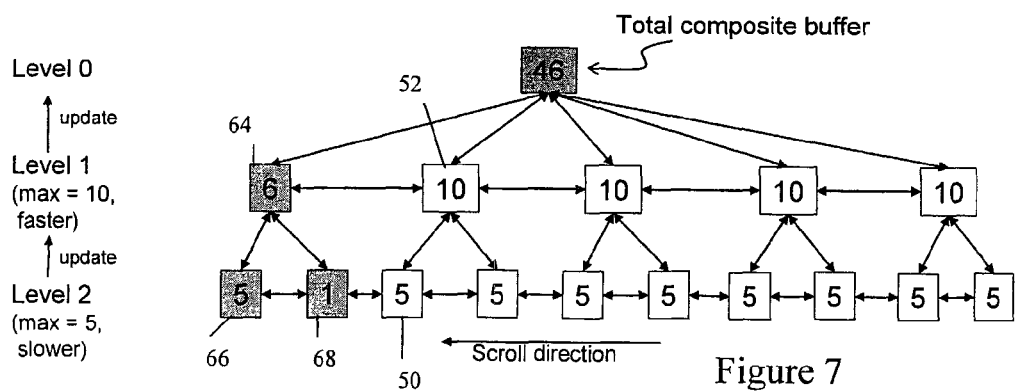

In act 32, the scroll speed and scroll direction are mapped to a level of the hierarchal set of partial composites. The partial composites to be altered are selected based on the scroll increment or speed and the direction. The direction determines the side of or location in the hierarchy to examine. In the example of FIGS. 5 and 6, the increment of five frames of data is equal to the limit for the lower level two, so the scroll speed is mapped to the lower level two. Slower scroll speeds and corresponding increments are also mapped to the lower level two. The example of scrolling from FIG. 5 to FIG. 7 shows an increment size of greater than five (e.g., 6-10), so is mapped to the middle level one. The scroll speed, based on the respective increment size, is mapped to the closest buffer level with the same or more number of frames of data included in each buffer.

In a simplistic use of the multiple scroll buffer scheme, unsmooth scrolling performance can result if the number of scroll increments specified is mismatched with the stored buffer size. For example, if the user specified number of scroll increment is five but the stored buffer is ten, then the remaining five of the frames of data in the stored sum buffer would have to be recomputed to be subtracted from the previous sum buffers, thus removing the advantage of the multiple buffers. The scroll speeds may be limited to the composite sizes.

In practical uses, it is not reasonable to assume, as in the example above, that the total number of frames of data within the thick MPR nicely divides into N equal integer sizes.

Rather than having the user define the number of scroll increments at each frame freely, the user simply defines one of a limited number of scroll speeds. A higher speed indicates a larger number of scroll increments. This usage works nicely into the typical usage and mapping of the computer mouse speed. The user or developer may define the maximum number of scroll increments at the highest speed allowed, and the number of speed levels. The maximum number of scroll increments is less than the total number of frames of data in the thick MPR. Given these parameters, the maximum number of scroll increments is linearly interpolated for any speed level in the hierarchy. Alternatively, the range of scroll speeds includes speeds not equal to a composite size.

Each level is assigned a maximum composite size which affects the scrolling hierarchy. In the example of scrolling from FIG. 5 to FIG. 6 at the slower level 2 hierarchy, five frames should be added onto the level 1 buffer 54, but since buffer 54 is already reached the maximum limit of ten, a new buffer 60 is created to hold the remaining frame instead.

At a given speed level, the number of scroll increments is governed by the buffer in the hierarch and the number of increment frames is not guaranteed to be constant. In the example of scrolling from FIG. 5 to FIG. 7, the increment size limit may be 10 at level 1. Rather than scroll by 10 in the first alteration, an initial scroll is by six to clear buffers 54, 56, and 58 in FIG. 5. The next scroll increment is by 10. Further subsequent scroll increments may be less than 10 even though the composite to have frames removed is formed from 10 frames of data. In this case, the frames to be removed may be recomputed or regenerated for removal.

In act 34, further partial composites may be altered. The further partial composites are entirely formed from new frames of data being included. The new frames of data are determined from the volume data set and composited. For example in scrolling from FIG. 5 to FIG. 6, the new composite 60 does not include frames from any previous composite. In another example in scrolling from FIG. 5 to FIG. 7, the new composites 64, 66, and 68 do not include frames of data from any previous composites.

To alter, the partial composites of the identified buffers are updated. For the lowest level, frames of data to be removed are generated or retrieved for subtraction. Frames of data to be included are generated. For other levels, the partial composites are updated by subtracting or adding partial composites of one or more children nodes. Prior to updating based on a lower level composite, a parent composite may be used to remove the contribution from its parent composite. For example, the total composite is altered by removing the contribution of a partial composite to be updated. The partial composite is updated and the updated partial composite is used to update the total composite.

For maximum and blending, replacement instead of subtraction or addition is used. All the component frames of data are generated for a new partial composite. Parent or higher composites may be replaced due to alteration of lower level partial composites.

Some examples are provided in FIGS. 5-7 using sum composites. In one example for scrolling between FIGS. 5 and 6, the contribution of five frames of data is removed for a scrolling increment of five (slow scroll speed). The scrolling is from left to right in the FIGS. 5 and 6.

The contribution of the five frames of data from 50 is removed from composites 52, and from the total composite. The contribution of the five frames of data to be removed is provided by the composite 50. The composite 50 is subtracted from the composite 52 and the total composite, providing an updated composite 52 (see FIG. 6) and total composite. The composite 50 is pruned, such as being removed or not used as shown in FIG. 6.

In this example, five new frames of data are to be included. The composite 58 of FIG. 5 includes one frame where the limit is five. Four of the new frames of data are composited with the one already included frame of data by adding. The remaining frame of data to be included is composited as a new composite 62.

To propagate the additions to higher levels, the child composites, up to the limit of the parent composite, are summed. The updated sub-portion of the new child composite is added to the parent. For example, the four new sub-portion of the new composite 58 is added to composite 54 and the total composite. Since the composite 54 is at the limit of ten frames, a new middle level one composite 60 is formed to contain the remaining 1 frame.

When a fast speed is chosen, the level one is selected. FIGS. 5 and 7 shows an example of scrolling from right to left at a faster speed, such as at an increment of 6 or 10. The composite 54 includes only frames of data no longer to be included, so is subtracted from the total composite. The composite 54 and the children composites 56 and 58 are pruned. The contribution of the six frames of data to be removed is no longer in the total composite.

For the six new frames of data to be included, new composites are calculated. The other composites at the middle level are at the limit of ten frames. New composites are formed at the lowest level, such as one (66) of five frames of data and another of one (68) of one frame of data. The new child composites 66, 68 are added together to form the new middle level composite 64. The new middle level composite 64 is added to the total composite.

For the next increment, another six frames of data are added to one side and removed from the other side. The increment may be altered to provide for more efficient computation, such as incrementing to prune complete composites. Although the number of increments is not necessarily the same at each speed, the computational time is more constant than re-generating all the frames of data or re-generating all the frames of data to be removed and to be added. A more constant time visual feedback may be provided.

In act 36, the updated total composite is used to generate an image. The image is generated as a visualization as described for act 24. As scrolling continues, the total composite is updated and a corresponding image is generated.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A system for multiplanar reformatting visualization with multiple scrolling speeds, the system comprising:

a memory operable in a hierarchal buffer structure, each level of the hierarchal buffer structure having one or more buffers each storing a composite of a number of frames of data, the number for each level being different;

a user input operable to receive scrolling speeds, different scrolling speeds mapped to different levels of the hierarchal buffer structure;

a processor operable to subtract from, to add to, to modify by means of maximum or minimum operation, or to reblend the composites in each level, and operable to select, as a function of the scrolling speed, one or more buffers for subtracting and adding; and a display operable to display a sequence of images representing scrolling a multiplanar reformatting visualization through a volume at the scrolling speed, each multiplanar reformatting visualization being an average from the composite of one of the buffers of the hierarchal buffer structure.

2. The system of claim 1 wherein the hierarchal buffer structure comprises three levels, the number for the buffers of the first level being X, the number for the buffers of the second level being about 2X, and the number of the third level being Y for a single buffer.

3. The system of claim 1 wherein the scroll speed maps to the level of the hierarchal buffer structure with the number closest to a frame skip size for the scroll speed and greater than or equal to the frame skip size.

4. The system of claim 1 wherein a total count of the frames in each level is equal.

5. The system of claim 1 wherein the processor is operable to subtract the composite in one buffer of a lower level from another buffer of a higher level.

6. The system of claim 1 wherein the hierarchal buffer structure has a first level with a single buffer, a second level with at least two buffers, and a third level with at least three buffers and more than the at least two buffers of the second level, a total count of frames in each level being equal.

7. The system of claim 1 wherein the user input is a scroll wheel or a computer mouse movement speed.

8. A method for multiplanar reformatting visualization with multiple scrolling speeds, the method comprising:

calculating at least first and second partial composites, and a first total composite of a first plurality of frames of data;

generating a first image as a function of the first total composite;

receiving a scroll input designating a second plurality of frames of data as a function of speed of scrolling different than a previous speed used for the first total composite; and wherein receiving the scroll input comprises receiving the speed of scrolling; further comprising: mapping the scroll speed to a first level of a hierarchal set of partial composites including the first and second partial composites on the first level; and wherein the first partial composite is of a first number of frames of data, and the second partial composite is of a second number greater than the first number of frames of data; wherein mapping comprises selecting the first level as a function of the first and second numbers of frames of data; and altering at least the first partial composite and the total composite as a function of the scroll input; and generating a second image as a function of the altered total composite.

9. The method of claim 8 wherein the first and second partial composites do not include a common frame of data, and wherein the first and second plurality of frames include a same subset of frames, the first plurality including at least a first frame not in the second plurality and the second plurality including at least a second frame not in the first plurality;

wherein altering comprises:
subtracting or removing the first frame from the first partial composite;
adding or recompositing the second frame to the second partial composite; and
adding or combining the first and second partial composite as the altered total composite.

10. The method of claim 8 wherein altering comprises:
subtracting a third partial composite on a second level of a hierarchal set of partial composites including the first and second partial composites from the first partial composite.

11. The method of claim 10 wherein altering comprises:
adding a fourth partial composite on the second level of the hierarchal set of partial composites; and
summing the altered first partial composite and the fourth partial composite.

12. The method of claim 8 wherein altering comprises adding a second frame of the second plurality or subtracting a first frame of the first plurality of frames from the first partial composite, adding or subtracting the first partial composite from the second partial composite, and adding or subtracting the altered second partial composite from the first total composite.

13. The method of claim 8 wherein altering comprises altering the total composite as a function of the altered first partial composite.

14. The method of claim 8 wherein the first total composite and the second partial composite are responsive to a previous alteration.

15. The method of claim 8 further comprising:
determining partial composites for altering as a function of the scroll input.

16. In a non-transitory computer readable storage medium having stored therein data representing instructions executable by a programmed processor for multiplanar reformatting visualization with multiple scrolling speeds, the storage medium comprising instructions for:

creating a hierarchal arrangement of composite buffers, the arrangement having at least two levels, each level associated with a different scroll speed limit, and the buffers of each level having an upper limit of frames included in a composite, the upper limit of one level being greater than an upper limit of another level;

generating multiplanar reformatting visualizations as a function of composites of the buffers in the hierarchal arrangement.

17. The instructions of claim 16 further comprising:
updating a first composite of a first one of the buffers of the other level as a function of the scrolling speed; and
updating a second composite of a total composite buffer of the one level as a function of the updated first composite;
wherein generating comprises generating first and second multiplanar reformatting visualizations as a function of the second composite and updated second composite, respectively.

18. The instructions of claim 17 wherein creating comprises creating a third level of composite buffers, the composite buffers of the third level having a lesser upper limit than the other level, the third level associated with a lesser scroll speed limit than the other and one levels;

wherein the updating the first composite comprises adding, subtracting, or recompositing a third composite from one of the composite buffers of the third level from the first composite; and wherein updating the second composite comprises adding, subtracting, or recompositing the first composite from the second composite.

19. The instructions of claim 16 wherein creating comprises providing access between composite buffers within levels and between levels, the access between levels corresponding to a pyramidal structure.

* * * * *